US010375613B2

United States Patent
Zhang et al.

(10) Patent No.: US 10,375,613 B2
(45) Date of Patent: Aug. 6, 2019

(54) METHOD AND DEVICE FOR CELL RESELECTION

(71) Applicant: Beijing Xiaomi Mobile Software Co., Ltd., Beijing (CN)

(72) Inventors: Guoquan Zhang, Beijing (CN); Qianhong Huang, Beijing (CN)

(73) Assignee: Beijing Xiaomi Mobile Software Co., Ltd, Beijing (CN)

( * ) Notice: Subject to any disclaimer, the term of this patent is extended or adjusted under 35 U.S.C. 154(b) by 0 days.

(21) Appl. No.: 15/636,866

(22) Filed: Jun. 29, 2017

(65) Prior Publication Data

US 2018/0146407 A1 May 24, 2018

(30) Foreign Application Priority Data

Nov. 21, 2016 (CN) .......................... 2016 1 1027839

(51) Int. Cl.
*H04W 36/00* (2009.01)
*H04W 36/24* (2009.01)
(Continued)

(52) U.S. Cl.
CPC ..... *H04W 36/245* (2013.01); *H04W 36/0005* (2013.01); *H04W 36/08* (2013.01);
(Continued)

(58) Field of Classification Search
None
See application file for complete search history.

(56) References Cited

U.S. PATENT DOCUMENTS

| 2006/0258386 A1* | 11/2006 | Jeong | H04W 36/24 |
| | | | 455/525 |
| 2010/0272050 A1* | 10/2010 | Lim | H04W 8/22 |
| | | | 370/329 |

(Continued)

FOREIGN PATENT DOCUMENTS

| CN | 101690322 A | 3/2010 |
| CN | 104170471 A | 11/2014 |

(Continued)

OTHER PUBLICATIONS

Extended Search Report for European Application No. 17201961.4 from the European Patent Office, dated Feb. 1, 2018.

(Continued)

*Primary Examiner* — San Htun
(74) *Attorney, Agent, or Firm* — Finnegan, Henderson, Farabow, Garrett & Dunner LLP (57) ABSTRACT

A method for a device to perform cell reselection, includes: when the device resides in a current serving cell, determining whether a neighboring cell meets a cell reselection condition; if the neighboring cell meets the cell reselection condition, obtaining cell reselection information corresponding to the neighboring cell; determining whether the cell reselection information matches any one of one or more historical ping-pong reselection records; if the cell reselection information matches a first historical ping-pong reselection record of the one or more historical ping-pong reselection records, determining whether a time difference between a current cell reselection time and a historical cell reselection time corresponding to the first historical ping-pong reselection record is greater than a preset time difference; and if the time difference is greater than the preset time difference, reselecting the neighboring cell as a current serving cell.

18 Claims, 9 Drawing Sheets

(51) Int. Cl.
*H04W 36/08* (2009.01)
*H04W 48/18* (2009.01)

(52) U.S. Cl.
CPC .... *H04W 36/0055* (2013.01); *H04W 36/0061* (2013.01); *H04W 48/18* (2013.01); *Y02D 70/00* (2018.01); *Y02D 70/142* (2018.01); *Y02D 70/144* (2018.01); *Y02D 70/166* (2018.01)

(56) References Cited

U.S. PATENT DOCUMENTS

| | | | |
|---|---|---|---|
| 2011/0177819 A1 | 7/2011 | Kitahara | |
| 2012/0071167 A1* | 3/2012 | Bhandari | H04W 48/20 455/443 |
| 2012/0077502 A1* | 3/2012 | Liu | H04W 36/0085 455/438 |
| 2012/0135737 A1* | 5/2012 | Yoshihara | H04W 36/30 455/436 |
| 2013/0225171 A1* | 8/2013 | Singh | H04W 36/245 455/436 |
| 2013/0331103 A1* | 12/2013 | Yang | H04W 36/26 455/436 |
| 2014/0274063 A1 | 9/2014 | Singh et al. | |
| 2015/0172966 A1* | 6/2015 | Watanabe | H04W 24/02 455/436 |
| 2015/0172982 A1* | 6/2015 | Park | H04W 36/14 370/332 |
| 2015/0382182 A1 | 12/2015 | Lim et al. | |
| 2016/0007260 A1* | 1/2016 | Abraham | H04W 36/0083 370/331 |

FOREIGN PATENT DOCUMENTS

| | | |
|---|---|---|
| CN | 105208609 A | 12/2015 |
| JP | 08-508630 A | 9/1996 |
| JP | 2004040338 A | 2/2004 |
| JP | 2011511488 A | 4/2011 |
| JP | 2013093732 A | 5/2013 |
| JP | 2014024439 A | 2/2014 |
| RU | 2485721 C2 | 6/2013 |
| WO | WO 2006/096036 A1 | 9/2006 |
| WO | WO 2009/004405 A1 | 1/2009 |
| WO | WO 2014024439 A1 | 2/2014 |

OTHER PUBLICATIONS

International Search Report of PCT Application No. PCT/CN2016/110998, dated Aug. 7, 2017, issued by the ISA/CN—State Intellectual Property Office of the P.R. China.

* cited by examiner

Fig. 9

METHOD AND DEVICE FOR CELL RESELECTION

CROSS-REFERENCE TO RELATED APPLICATIONS

The present application is based upon and claims priority to Chinese Patent Application No. 201611027839X, filed Nov. 21, 2016, the entire contents of which are incorporated herein by reference.

TECHNICAL FIELD

The present disclosure generally relates to the communication technical field, and more particularly, to a method and device for cell reselection.

BACKGROUND

At present, a ping-pong reselection phenomenon often occurs during cell reselection due to improper configuration of network reselection parameters. For example, when a terminal is residing in a cell A, the terminal may select a cell B according to current cell reselection parameters. When the terminal is residing in the cell B, the terminal may select the cell A again according to the cell reselection parameters. Such frequent switching between two cells is referred to as ping-pong reselection. The ping-pong reselection will result in a high standby current of the terminal, and thereby influence a standby time of the terminal and user experience.

SUMMARY

According to a first aspect of the present disclosure, there is provided a method for a device to perform cell reselection, comprising: when the device resides in a current serving cell, determining whether a neighboring cell meets a cell reselection condition; if the neighboring cell meets the cell reselection condition, obtaining cell reselection information corresponding to the neighboring cell; determining whether the cell reselection information matches any one of one or more historical ping-pong reselection records, wherein the cell reselection information includes at least a current cell reselection time, and each of the one or more historical ping-pong reselection records includes at least a historical cell reselection time corresponding to the ping-pong reselection record; if the cell reselection information matches a first historical ping-pong reselection record of the one or more historical ping-pong reselection records, determining whether a time difference between the current cell reselection time and the historical cell reselection time corresponding to the first historical ping-pong reselection record is greater than a preset time difference; and if the time difference between the current cell reselection time and the historical cell reselection time corresponding to the first historical ping-pong reselection record is greater than the preset time difference, reselecting the neighboring cell as a current serving cell.

According to a second aspect of the present disclosure, there is provided a device for cell reselection, comprising: a processor; and a memory for storing instructions executable by the processor; wherein the processor is configured to: when the device resides in a current serving cell, determine whether a neighboring cell meets a cell reselection condition; if the neighboring cell meets the cell reselection condition, obtain cell reselection information corresponding to the neighboring cell; determine whether the cell reselection information matches any one of one or more historical ping-pong reselection records, wherein the cell reselection information includes at least a current cell reselection time, and each of the one or more historical ping-pong reselection records includes at least a historical cell reselection time corresponding to the ping-pong reselection record; if the cell reselection information matches a first historical ping-pong reselection record of the one or more historical ping-pong reselection records, determine whether a time difference between the current cell reselection time and the historical cell reselection time corresponding to the first historical ping-pong reselection record is greater than a preset time difference; and if the time difference between the current cell reselection time and the historical cell reselection time corresponding to the first historical ping-pong reselection record is greater than the preset time difference, reselect the neighboring cell as a current serving cell.

According to a third aspect of the present disclosure, there is provided a non-transitory computer-readable storage medium having stored therein instructions that, when executed by a processor of a device, cause the device to perform a method for cell reselection, the method comprising: when the device resides in a current serving cell, determining whether a neighboring cell meets a cell reselection condition; if the neighboring cell meets the cell reselection condition, obtaining cell reselection information corresponding to the neighboring cell; determining whether the cell reselection information matches any one of one or more historical ping-pong reselection records, wherein the cell reselection information includes at least a current cell reselection time, and each of the one or more historical ping-pong reselection records includes at least a historical cell reselection time corresponding to the ping-pong reselection record; if the cell reselection information matches a first historical ping-pong reselection record of the one or more historical ping-pong reselection records, determining whether a time difference between the current cell reselection time and the historical cell reselection time corresponding to the first historical ping-pong reselection record is greater than a preset time difference; and if the time difference between the current cell reselection time and the historical cell reselection time corresponding to the first historical ping-pong reselection record is greater than the preset time difference, reselecting the neighboring cell as a current serving cell.

It is to be understood that both the foregoing general description and the following detailed description are exemplary only and are not restrictive of the present disclosure.

BRIEF DESCRIPTION OF THE DRAWINGS

The accompanying drawings, which are incorporated in and constitute a part of this specification, illustrate embodiments consistent with the present disclosure and, together with the description, serve to explain the principles of the present disclosure.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the present disclosure. Instead, they are merely examples of devices and methods consistent with aspects related to the present disclosure as recited in the appended claims.

In order to reduce ping-pong reselection by a terminal, exemplary embodiments of the present disclosure provide methods for cell reselection. These methods can be applied in a cell reselection program, system or device, and can be performed by a terminal such as a mobile phone.

Figure 1:
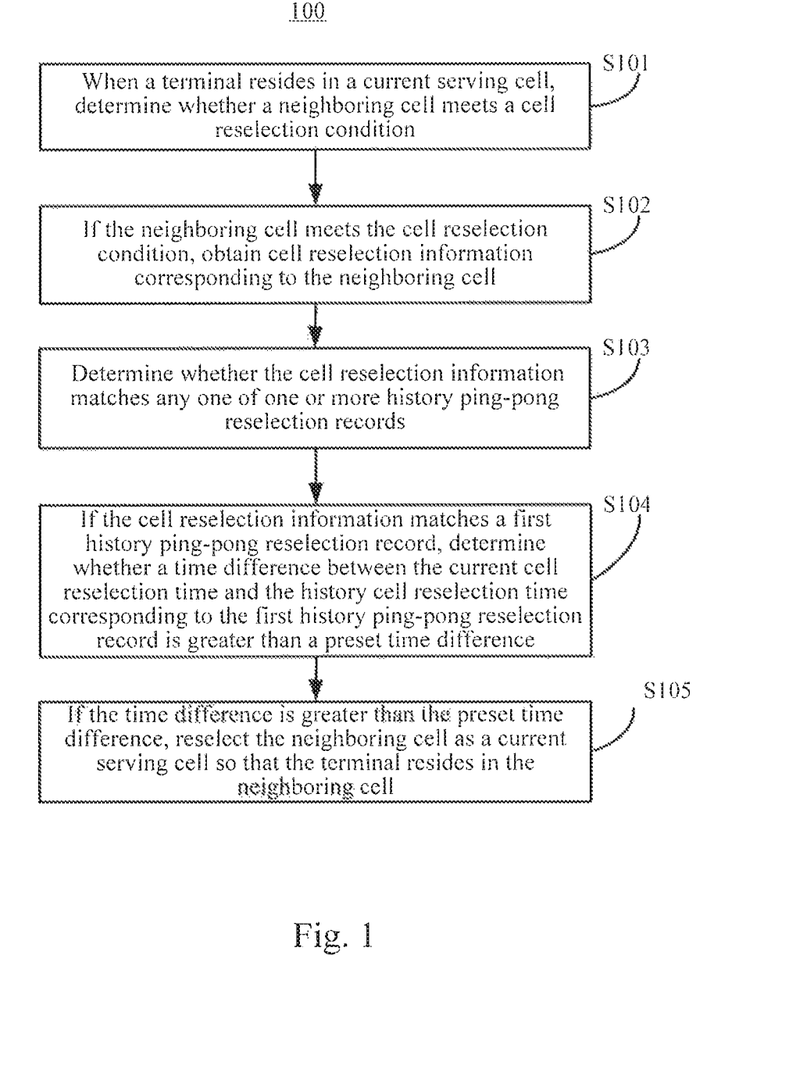
FIG. 1 is a flowchart of a method for cell reselection according to an exemplary embodiment.

FIG. 1 is a flowchart of a method 100 for cell reselection according to an exemplary embodiment. As shown in FIG. 1, the method 100 includes steps S101 to S105.

In step S101, when a terminal resides in a current serving cell, whether a neighboring cell meets a cell reselection condition is determined.

There may be one or more neighboring cells, e.g., six neighboring cells for a cellular network, and there may be one or more neighboring cells that meet the cell reselection condition.

In step S102, if the neighboring cell meets the cell reselection condition, cell reselection information corresponding to the neighboring cell is obtained.

In step S103, whether the cell reselection information matches any one of one or more historical ping-pong reselection records is determined. For example, the cell reselection information includes at least a current cell reselection time, and each of the historical ping-pong reselection records includes at least a historical cell reselection time corresponding to the ping-pong reselection record. Also for example, the cell reselection time can be defined based on a system frame number (SFN).

There may be one or more historical ping-pong reselection records, and each of the historical ping-pong reselection records may include not only the historical cell reselection time corresponding to the historical ping-pong reselection record, but also an identification of a source cell before the reselection and an identification of a destination cell after the reselection, and a reason for the reselection and the like. The cell reselection information may also include the above information.

In step S104, if the cell reselection information matches a first ping-pong reselection record of the historical ping-pong reselection records, whether a time difference between the current cell reselection time and the historical cell reselection time corresponding to the first historical ping-pong reselection record is greater than a preset time difference is determined.

If the cell reselection information matches the first historical ping-pong reselection record, it indicates that if the neighboring cell is reselected, ping-pong reselection may occur. That is to say, if the neighboring cell is reselected, the current cell reselection and a second cell reselection in the first ping-pong reselection record may form a ping-pong selection, or if the neighboring cell is reselected, according to the first ping-pong reselection record, a previous serving cell may be reselected after the reselection of the neighboring cell and thereby a ping-pong reselection may occur. For example, if the first ping-pong record indicates a selection of a cell B when a terminal is residing in a cell A (this can be considered as the first cell reselection in the first ping-pong reselection record), and a selection of the cell A when the terminal is residing in the cell B (this can be considered as the second cell reselection in the first ping-pong reselection record), and if the current serving cell is the cell A, the neighboring cell B meets the cell reselection condition and the cell reselection information corresponding to the neighboring cell B matches the ping-pong reselection record. Moreover, the reselection of the cell B and the reselection of the cell A when the terminal is residing in the cell B may form a ping-pong reselection, because according to the first ping-pong reselection record, if the cell B is reselected, the terminal may select the cell A again. Thus, the ping-pong reselection may occur.

In the exemplary embodiment, to make the determination result of the ping-pong reselection more accurate, the historical ping-pong reselection records may include multiple recent reselection records. For example, the most recent reselection record may be used as the comparison object. It is assumed that the most recent reselection record indicates a selection of the cell B when the terminal is residing in the cell A and a selection of the cell A when the terminal is residing in the cell B, and the time when the terminal re-resides in the cell A in the most recent reselection record and the time when the terminal is residing in the cell A as the current serving cell in step S101 are continuous and match each other. Accordingly, if the cell B is reselected after step S104, the selection of the cell B when the terminal is residing in the cell A and the second cell reselection (i.e., the selection of the cell A when the terminal is residing in the cell B) in the most recent ping-pong reselection record, form a ping-pong reselection.

Further, the historical ping-pong reselection records may include various ping-pong reselection records. For example, the ping-pong reselection records may include a ping-pong reselection record which indicates a selection of the cell B when the terminal is residing in the cell A and a reselection of the cell A when the terminal is residing in the cell B, and a ping-pong reselection record which indicates a selection of a cell D when the terminal is residing in a cell C and a selection of the cell C (again) when the terminal is residing in the cell D, and so on.

The preset time difference may be a shortest ping-pong reselection time interval during a ping-pong cell reselection procedure. For example, if the ping-pong reselection procedure is the cell A-the cell B-the cell A, the preset time difference may be the shortest ping-pong reselection time interval which starts from the time when the terminal resides in the cell A, through the time when the terminal switches from the cell A to the cell B and then switches from the cell B back to the cell A.

In some embodiments, the preset time difference may be set by a user. Also, the preset time difference may be continuously increased.

In step S105, if the time difference between the current cell reselection time and the historical cell reselection time corresponding to the first historical ping-pong reselection record is greater than the preset time difference, the neighboring cell is reselected as a current serving cell so that the terminal resides in the neighboring cell.

In the embodiment, if the neighboring cell meets the cell reselection condition, by obtaining cell reselection information corresponding to the neighboring cell, whether the cell reselection information corresponding to the neighboring cell matches a historical ping-pong reselection record can be determined. If the cell reselection information matches, e.g., the first historical ping-pong reselection record, it indicates that if the neighboring cell is reselected, a ping-pong reselection may occur, and thus it is needed to further determine whether a time difference between the current cell reselection time and the historical cell reselection time corresponding to the first historical ping-pong reselection record is greater than a preset time difference. If the time difference is greater than the preset time difference, it indicates that even the current selection may be a ping-pong reselection, the current selection is far from the historical cell reselection corresponding to the first historical ping-pong reselection record, and may not be deemed as a frequent ping-pong reselection and not result in too much consumption of power of the terminal. Thus, the neighboring cell can be reselected as the serving cell, and the terminal can reside in the neighboring cell to make the neighboring cell provide service to the user. By such determination of whether the cell reselection information matches a historical ping-pong reselection record and comparison of the cell reselection time difference, the frequency for ping-pong reselections can be effectively lowered, consumption of power by the terminal due to the ping-pong reselections can be reduced, and the standby time of the terminal can be extended, thereby improving user experience.

In addition, if the time difference between the current cell reselection time and the historical cell reselection time corresponding to the first historical ping-pong reselection record is not greater than the preset time difference, the neighboring cell may not be reselected at the moment, and the terminal may continue to reside in the current serving cell.

In the present disclosure, steps S101, S102, S103, S104, and S105 may be performed continuously, or periodically.

Figure 2:
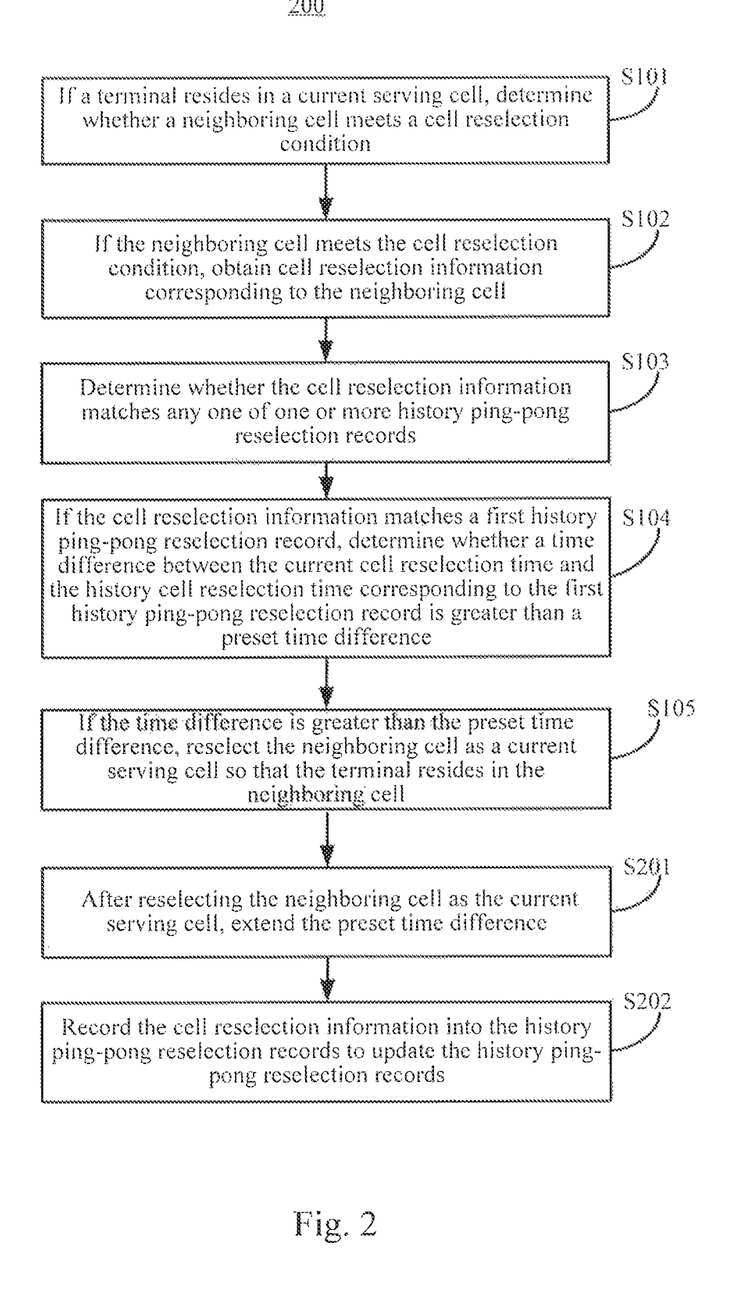
FIG. 2 is a flowchart of a method for cell reselection according to an exemplary embodiment.

FIG. 2 is a flowchart of a method 200 for cell reselection according to an exemplary embodiment. As shown in FIG. 2, the method 200 includes steps S201 and S202, in addition to steps S101-S105 (FIG. 1).

In step S201, after the neighboring cell is reselected as the current serving cell, the preset time difference is extended.

In step S202, cell reselection information is recorded into the historical ping-pong reselection records, to update the historical ping-pong reselection records.

In the method 200, after the neighboring cell is reselected as the current serving cell, the preset time difference can be extended, so as to reduce ping-pong reselections which repeatedly occur within a short time period. For example, each time after steps S101 to S104 are performed, if it is determined that the time difference between the current cell reselection time and the historical cell reselection time corresponding to the first historical ping-pong reselection record is greater than the preset time difference, the preset time difference may be extended up to two or three times the present preset time difference.

After the cell reselection information is recorded into the historical ping-pong reselection records, the historical ping-pong reselection records is updated, so that the historical ping-pong reselection records can be enriched, which is helpful for subsequent determination of whether a cell reselection belongs to a ping-pong reselection according to the enriched historical ping-pong reselection records.

Figure 3:
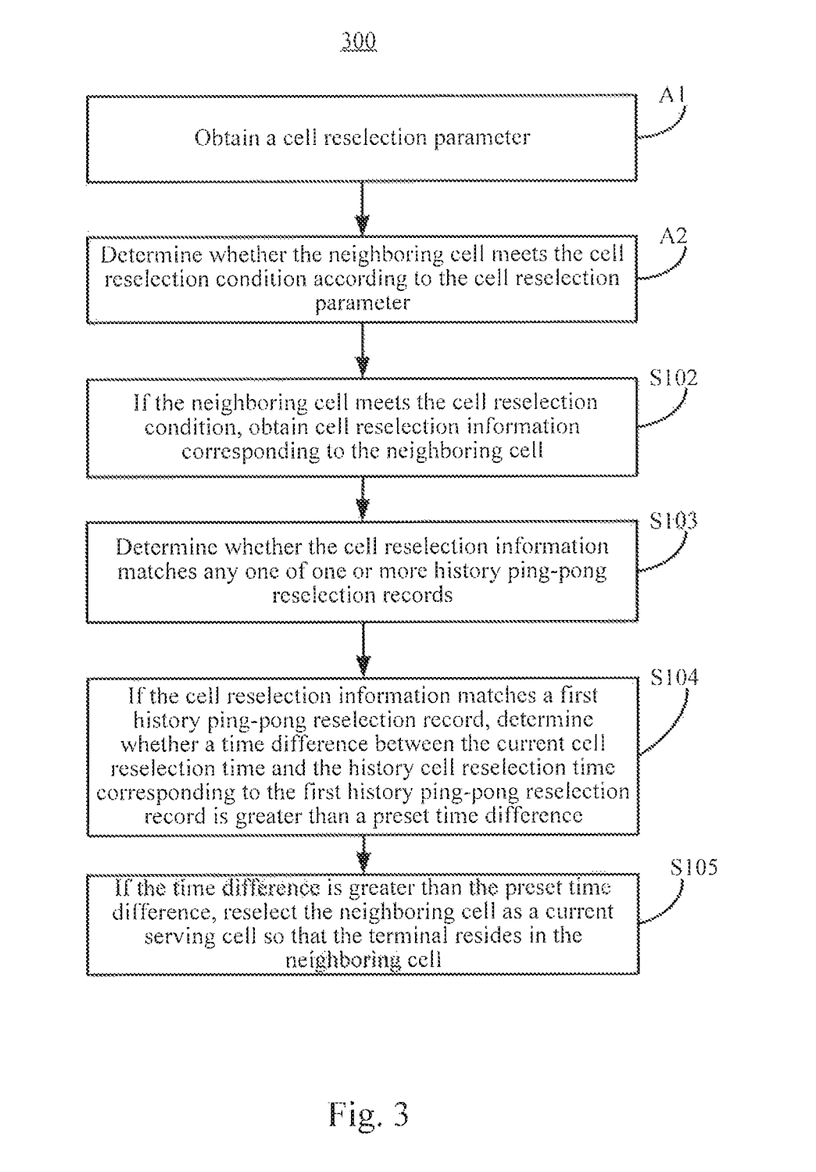
FIG. 3 is a flowchart of a method for cell reselection according to an exemplary embodiment.

FIG. 3 is a flowchart of the method 100 (FIG. 1) for cell reselection according to an exemplary embodiment. As shown in FIG. 3, step S101 in FIG. 1 includes steps A1 and A2.

In step A1, a cell reselection parameter is obtained.

In step A2, whether the neighboring cell meets the cell reselection condition is determined according to the cell reselection parameter.

In the exemplary embodiment, to determine whether the neighboring cell meets the cell reselection condition, the cell reselection parameter may be obtained automatically, and then whether the neighboring cell meets the cell reselection condition can be determined according to the cell reselection parameter.

In one exemplary embodiment, step A1 includes receiving system information sent from a base station of the current serving cell, wherein the system information includes at least one of a reselection priority of the current serving cell, a minimum access level of the current serving cell, a reselection priority of the neighboring cell, and a minimum access level of the neighboring cell, and wherein different cells may have different minimum access levels.

The reselection priority of the current serving cell and the minimum access level of the current serving cell may be carried in a message 3 in the system information sent from the base station of the current serving cell, and the reselection priority of the neighboring cell and the minimum access level of the neighboring cell may be carried in a message 5 in the system information sent from the base station of the current serving cell. The "message 3" and the "message 5" are terms that one of ordinary skill in the art will understand.

In the exemplary embodiment, the minimum access level is used to avoid access of the terminal to a system under a very low receiving signal level (the communication quality of the access usually cannot ensure normal communication procedures), which may result in poor communication quality provided to a user and unnecessary waste of wireless resources of networks. For example, according to provisions of a GSM system, if the terminal needs to access a network, a receiving level of the terminal needs to be greater than a threshold level, i.e., the minimum receiving level which allows the terminal to access the network.

In one exemplary embodiment, step A1 includes measuring a signal quality of the current serving cell and a signal quality of the neighboring cell, wherein each signal quality includes at least one of a current signal level, a reference signal receiving power (RSRP), or a reference signal receiving quality (RSRQ).

For example, the terminal may measure the signal quality of the current serving cell according to a paging message sent from the base station of the current serving cell or network signals. Similarly, the terminal may measure the signal quality of the neighboring cell in the similar way.

In one exemplary embodiment, step A2 includes, if the cell reselection parameter meets a preset condition, determining that the neighboring cell meets the cell reselection condition. The preset condition may include: the current signal level of the neighboring cell is not lower than the minimum access level of the neighboring cell and the reselection priority of the neighboring cell is higher than the reselection priority of the current serving cell; or a signal level corresponding to the reference signal receiving power of the neighboring cell is not lower than the minimum access level of the neighboring cell and the reselection priority of the neighboring cell is higher than the reselection priority of the current serving cell.

If the measured current signal level of the neighboring cell is not lower than the minimum access level of the neighboring cell or the signal level corresponding to the reference signal receiving power of the neighboring cell is not lower than the minimum access level of the neighboring cell, it indicates that if the terminal resides in the neighboring cell, the communication quality will be good. Under such condition, the neighboring cell is qualified for reselection. Then, if the reselection priority of the neighboring cell is higher than the reselection priority of the current serving cell, it further indicates that the neighboring cell is better for the terminal to reside in than the current serving cell, and thus it can be determined that the neighboring cell meets the cell reselection condition.

In one exemplary embodiment, the preset condition may include: the current signal level of the current serving cell is lower than the minimum access level of the current serving cell and the reselection priority of the neighboring cell is lower than the reselection priority of the current serving cell.

If the current signal level of the current serving cell is lower than the minimum access level of the current serving cell, it indicates that if the terminal continues to reside in the current serving cell, poor communication quality may be provided, which will not meet communication requirements of the user. Thus, even if the reselection priority of the neighboring cell is lower than the reselection priority of the current serving cell, it will be better for the terminal to reside in the neighboring cell than in the current serving cell. Thus, under such condition, it can be determined that the neighboring cell meets the cell reselection condition. Also, under such condition, the current signal level of the neighboring cell should be not lower than the minimum access level of the neighboring cell.

The preset condition includes, but is not limited to, the above conditions. For example, the preset condition may further include that the reselection priority of the neighboring cell is higher than a preset reselection priority, or that the current signal level of the neighboring cell is higher than a preset signal level, or that the signal quality of the neighboring cell is higher than a preset signal quality, and the like.

In one exemplary embodiment, if there exist at least two neighboring cells which meet the cell reselection condition, step S102 may include: according to a reselection priority and/or a signal quality of each of the at least two neighboring cells, determining a target neighboring cell among the at least two neighboring cells, and obtaining the cell reselection information corresponding to the target neighboring cell. For example, the neighboring cell which has a higher reselection priority and/or a higher signal quality can be selected among the at least two neighboring cells as the target neighboring cell.

In the exemplary embodiment, if there exist at least two neighboring cells which meet the cell reselection condition, a target neighboring cell can be automatically identified among the at least two neighboring cells according to a reselection priority and/or a signal quality of each of the at least two neighboring cells, and the cell reselection information corresponding to the target neighboring cell can be further obtained. Then, step S103 can be performed. By doing so, ping-pong reselections within a short time period can be reduced.

In one exemplary embodiment, the cell reselection information further includes at least one of: an identification of the current serving cell, an identification of the neighboring cell, or a reason for the cell reselection.

The identification of the current serving cell may include an identity (i.e., a cell ID) and a frequency of the current serving cell. The identification of the neighboring cell may include an identity (i.e., a cell ID) and a frequency of the neighboring cell. The reason for the reselection may include a low cell reselection priority, a high minimum cell access level, a poor cell signal quality and the like.

In one exemplary embodiment, each historical ping-pong reselection record further includes at least one of: an identification of a source cell corresponding to the ping-pong reselection record, an identification of a destination cell corresponding to the ping-pong reselection record, and a reason for the cell reselection corresponding to the ping-pong reselection record. The above information in each ping-pong reselection record may be recorded in a table form.

The identification of the source cell corresponding to each ping-pong reselection record may be an identification of a cell which the terminal resides in before the first cell reselection in the ping-pong reselection record. The identification of the destination cell corresponding to each ping-pong reselection record may be an identification of a cell which the terminal resides in after the first cell reselection in the ping-pong reselection record.

For example, a ping-pong reselection record indicates that a terminal reselects a cell B when residing in a cell A, and then reselects the cell A when residing in the cell B (i.e., the terminal switches from the cell A to the cell B and then switches from the cell B back to the cell A). According to the ping-pong reselection record, the terminal resides in the cell A before the first cell reselection, and thus the identification of the source cell corresponding to the ping-pong reselection record is the identification of the cell A. After the first cell reselection, the terminal resides in the cell B, and accordingly the identification of the destination cell corresponding to the ping-pong reselection record is the identification of the cell B. The reason for the cell reselection corresponding to the ping-pong reselection record may be the reason why the terminal selects the cell B when residing in the cell A. In some embodiments, reasons for two cell reselections during a ping-pong reselection are basically the same, and thus the reason for the cell reselection may also be the reason why the terminal selects the cell A when residing in the cell B. A historical cell reselection time corresponding to the ping-pong reselection record is the time for the terminal to switch from the cell A to the cell B.

In one exemplary embodiment, step S103 includes, if the cell reselection information and one of the historical ping-pong reselection records meet a matching condition, determining that the cell reselection information matches the one of the historical ping-pong reselection records. The matching condition includes: the identification of the current serving cell matches the identification of the source cell corresponding to the one of the historical ping-pong reselection records; or the identification of the neighboring cell matches the identification of the destination cell corresponding to the one of the historical ping-pong reselection records; or the reason for the cell reselection included in the cell reselection information matches the reason for the cell reselection corresponding to the one of the historical ping-pong reselection records.

The matching of the identification of the current serving cell and the identification of the source cell corresponding to the one of the historical ping-pong reselection records may include that the identification of the current serving cell is the same as the identification of the source cell corresponding to the one of the historical ping-pong reselection records, i.e., the cell ID and the frequency of the current serving cell are the same as the cell ID and the frequency of the source cell corresponding to the one of the historical ping-pong reselection records, respectively.

The matching of the identification of the neighboring cell and the identification of the destination cell corresponding to the one of the historical ping-pong reselection records may include that the identification of the neighboring cell is the same as the identification of the destination cell corresponding to the one of the historical ping-pong reselection records, i.e., the cell ID and the frequency of the neighboring cell are the same as the cell ID and the frequency of the destination cell corresponding to the one of the historical ping-pong reselection records, respectively.

The matching of the reason for the cell reselection included in the cell reselection information and the reason for the cell reselection corresponding to the one of the historical ping-pong reselection records may indicate that the reason for the cell reselection included in the cell reselection information is the same as the reason for the cell reselection corresponding to the one of the historical ping-pong reselection records.

For example, a ping-pong reselection record indicates that a terminal reselects a cell D when residing in a cell C, and then reselects the cell C when residing in the cell D (i.e., the terminal switches from the cell C to the cell D and then switches from the cell D back to the cell C). The cell ID corresponding to the cell C is M, and the frequency corresponding to the cell C is N. The cell ID corresponding to the cell D is P, and the frequency corresponding to the cell D is Q. The reason for the cell reselection corresponding to the ping-pong reselection record is that a reselection priority of the current cell is low. Accordingly, the source cell and the destination cell corresponding to the ping-pong reselection record are the cell C and the cell D, respectively. Thus, if the current serving cell is the cell C having a cell ID of M and a frequency of N, a neighboring cell is the cell D having a cell ID of P and a frequency of Q, and a reason for the cell reselection is that the cell C has a low reselection priority, it indicates that the cell reselection information corresponding to the cell C in which the terminal currently resides matches the ping-pong reselection record.

Figure 4:
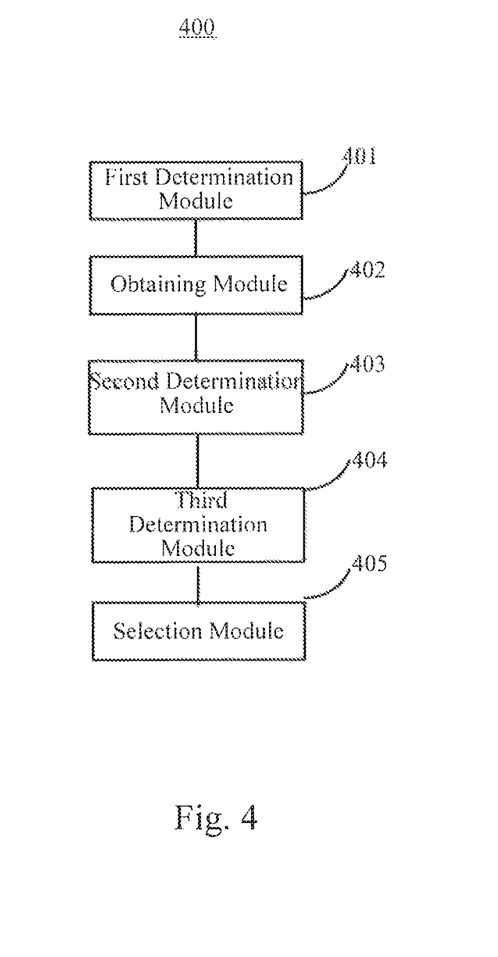
FIG. 4 is a block diagram of a device for cell reselection according to an exemplary embodiment.

FIG. 4 is a block diagram of a device 400 for cell reselection according to an exemplary embodiment. As shown in FIG. 4, the device 400 includes a first determination module 401, an obtaining module 402, a second determination module 403, a third determination module 404, and a selection module 405.

The first determination module 401 is configured to, if the device 400 resides in a current serving cell, determine whether a neighboring cell meets a cell reselection condition.

The obtaining module 402 is configured to, if the neighboring cell meets the cell reselection condition, obtain cell reselection information corresponding to the neighboring cell.

The second determination module 403 is configured to determine whether the cell reselection information matches any one of one or more historical ping-pong reselection records, wherein the cell reselection information includes at least a current cell reselection time, and each of the historical ping-pong reselection records includes at least a historical cell reselection time corresponding to the ping-pong reselection record.

The third determination module 404 is configured to, if the cell reselection information matches a first historical ping-pong reselection record of the historical ping-pong reselection records, determine whether a time difference between the current cell reselection time and a historical cell reselection time corresponding to the first historical ping-pong reselection record is greater than a preset time difference.

The selection module 405 is configured to, if the time difference between the current cell reselection time and the historical cell reselection time corresponding to the first historical ping-pong reselection record is greater than the preset time difference, reselect the neighboring cell as a current serving cell so that the device 400 resides in the neighboring cell.

Figure 5:
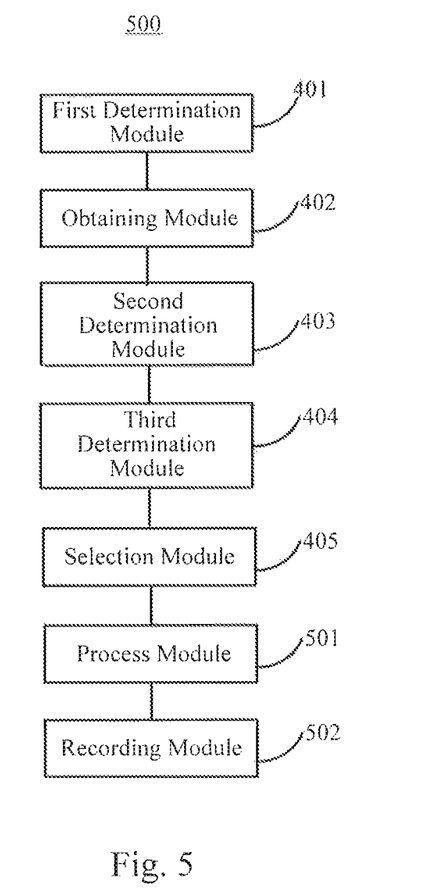
FIG. 5 is a block diagram of a device for cell reselection according to an exemplary embodiment.

FIG. 5 is a block diagram of a device 500 for cell reselection according to an exemplary embodiment. As shown in FIG. 5, the device 500 further includes a process module 501 and a recording module 502, in addition to the first determination module 401, the obtaining module 402, the second determination module 403, the third determination module 404, and the selection module 405 (FIG. 4).

The process module 501 is configured to, after the neighboring cell is reselected as the current serving cell, extend the preset time difference.

The recording module 502 is configured to record the cell reselection information into the historical ping-pong reselection records to update the historical ping-pong reselection records.

Figure 6:
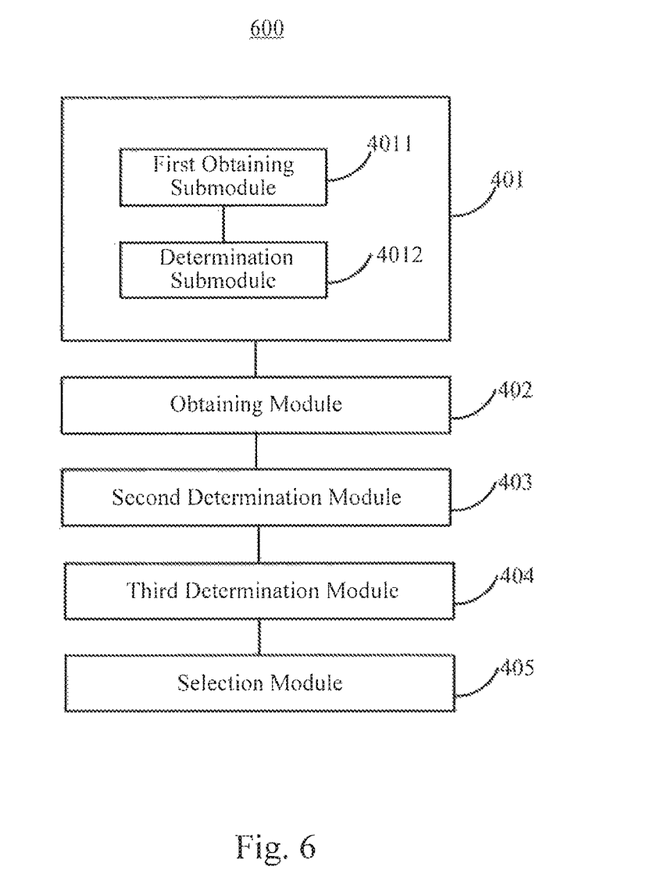
FIG. 6 is a block diagram of a device for cell reselection according to an exemplary embodiment.

FIG. 6 is a block diagram of a device 600 for cell reselection according to an exemplary embodiment. As shown in FIG. 6, the device 600 includes essentially the same modules as the device 400 (FIG. 4), and the first determination module 401 in the device 600 further includes a first obtaining submodule 4011 and a determination submodule 4012.

The first obtaining submodule 4011 is configured to obtain a cell reselection parameter.

The determination submodule 4012 is configured to determine whether the neighboring cell meets the cell reselection condition according to the cell reselection parameter.

In one exemplary embodiment, the first obtaining submodule 4011 may include a receiving unit and/or a measurement unit.

The receiving unit is configured to receive system information sent from a base station of the current serving cell, wherein the system information includes at least one of a reselection priority of the current serving cell, a minimum access level of the current serving cell, a reselection priority of the neighboring cell, or a minimum access level of the neighboring cell.

The measurement unit is configured to measure a signal quality of the current serving cell and a signal quality of the neighboring cell, wherein each signal quality includes at least one of a current signal level, a reference signal receiving power or a reference signal receiving quality.

In one exemplary embodiment, the determination submodule 4012 may include a determination unit.

The determination unit is configured to, if the cell reselection parameter meets a preset condition, determine that the neighboring cell meets the cell reselection condition.

The preset condition includes: the current signal level of the neighboring cell is not lower than the minimum access level of the neighboring cell and the reselection priority of the neighboring cell is higher than the reselection priority of the current serving cell; or a signal level corresponding to the reference signal receiving power of the neighboring cell is not lower than the minimum access level of the neighboring cell and the reselection priority of the neighboring cell is higher than the reselection priority of the current serving cell; or the current signal level of the current serving cell is lower than the minimum access level of the current serving cell and the reselection priority of the neighboring cell is lower than the reselection priority of the current serving cell.

Figure 7:
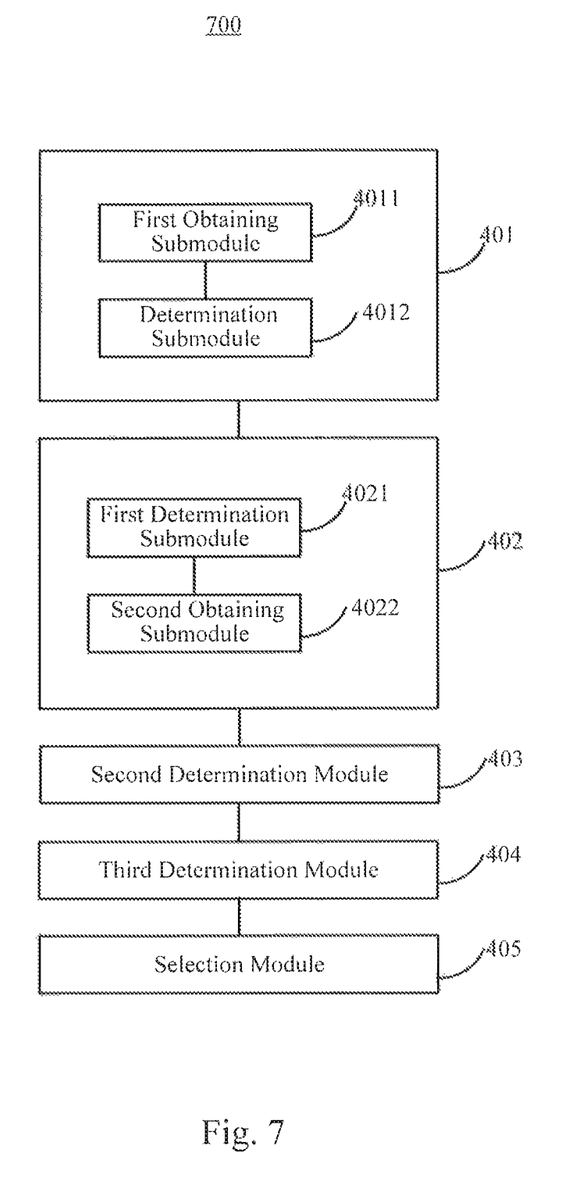
FIG. 7 is a block diagram of a device for cell reselection according to an exemplary embodiment.

FIG. 7 is a block diagram of a device 700 for cell reselection according to an exemplary embodiment. As shown in FIG. 7, the device 700 includes essentially the same modules as the device 600 (FIG. 6), and the obtaining module 402 in the device 700 further includes a first determination submodule 4021 and a second obtaining submodule 4022.

The first determination submodule 4021 is configured to, if there exist at least two neighboring cells which meet the cell reselection condition, determine a target neighboring cell among the at least two neighboring cells according to a reselection priority and/or a signal quality of each of the at least two neighboring cells.

The second obtaining submodule 4022 is configured to obtain the cell reselection information corresponding to the target neighboring cell.

In one exemplary embodiment, the cell reselection information further includes at least one of: an identification of the current serving cell, an identification of the neighboring cell, or a reason for the cell reselection.

In one exemplary embodiment, each historical ping-pong reselection record further includes at least one of: an identification of a source cell corresponding to the ping-pong reselection record, an identification of a destination cell corresponding to the ping-pong reselection record, or a reason for the cell reselection corresponding to the ping-pong reselection record.

Figure 8:
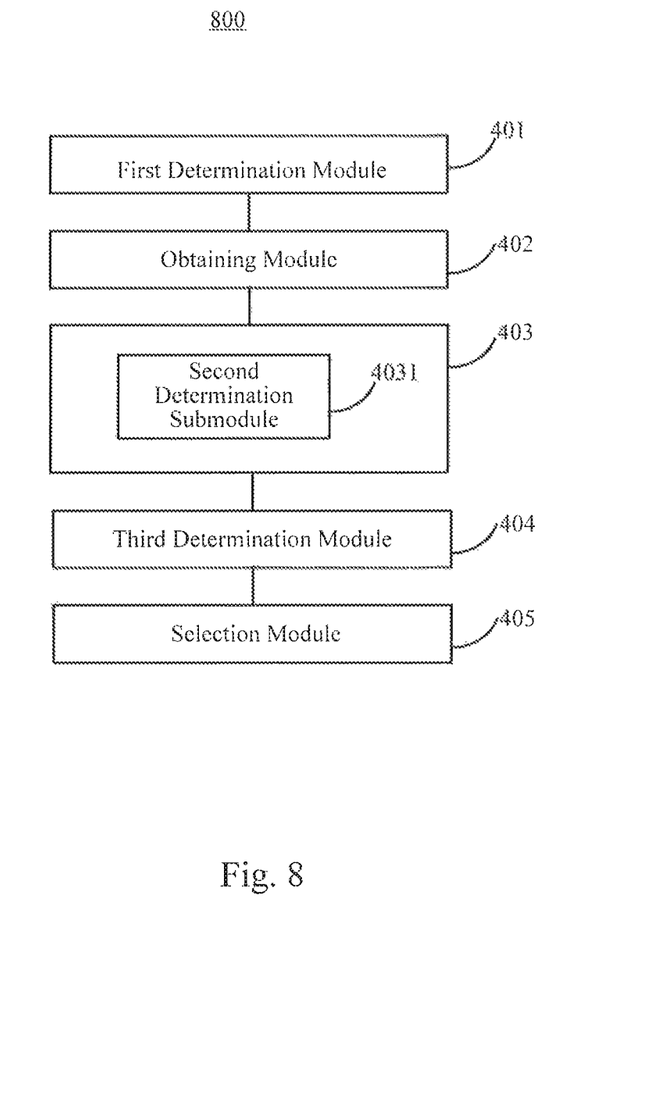
FIG. 8 is a block diagram of a device for cell reselection according to an exemplary embodiment.

FIG. 8 is a block diagram of a device 800 for cell reselection according to an exemplary embodiment. As shown in FIG. 8, the device 800 includes essentially the same modules as the device 400 (FIG. 4), and the second determination module 403 in the device 800 further includes a second determination submodule 4031.

The second determination submodule 4031 is configured to, if the cell reselection information and a first one of the historical ping-pong reselection records meet a matching condition, determine that the cell reselection information matches the first one of the historical ping-pong reselection records.

The matching condition includes: the identification of the current serving cell matches the identification of the source cell corresponding to the first one of the historical ping-pong reselection records; or the identification of the neighboring cell matches the identification of the destination cell corresponding to the first one of the historical ping-pong reselection records; or the reason for the cell reselection included in the cell reselection information matches the reason for the cell reselection corresponding to the first one of the historical ping-pong reselection records.

In exemplary embodiments, there is provided a device for cell reselection, including: a processor; and a memory for storing instructions executable by the processor. The processor is configured to execute the instructions for performing the above described methods.

Figure 9:
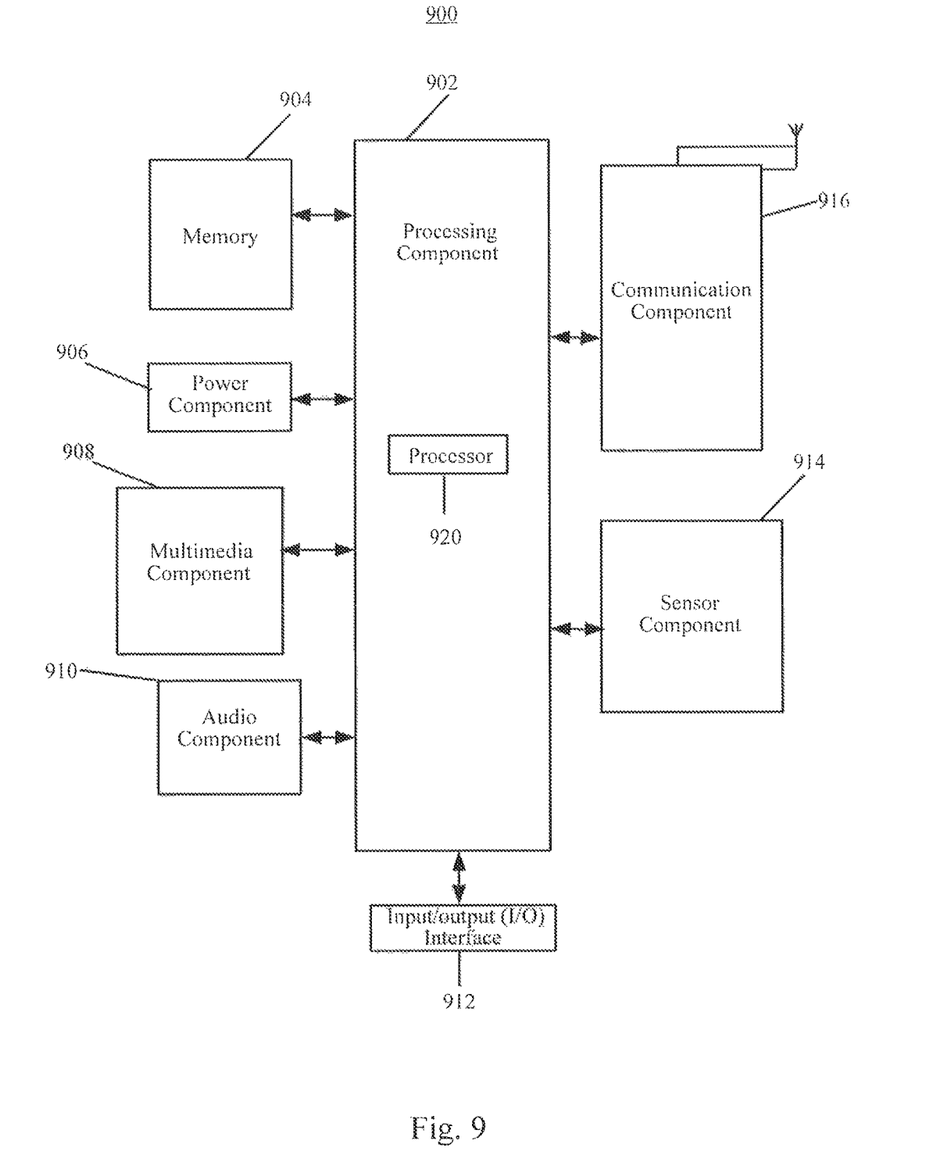
FIG. 9 is a block diagram of a device for cell reselection according to an exemplary embodiment.

FIG. 9 is a block diagram of a device 900 for cell reselection according to an exemplary embodiment. The device 900 may be a terminal, such as a mobile phone, a computer, a digital broadcast terminal, a messaging device, a gaming console, a tablet, a medical device, exercise equipment, a personal digital assistant, and the like.

The device 900 may include one or more of the following components: a processing component 902, a memory 904, a power component 906, a multimedia component 908, an audio component 910, an input/output (I/O) interface 912, a sensor component 914, and a communication component 916.

The processing component 902 typically controls overall operations of the device 900, such as the operations associated with display, telephone calls, data communications, camera operations, and recording operations. The processing component 902 may include one or more processors 920 to execute instructions to perform all or part of the steps in the above described methods. Moreover, the processing component 902 may include one or more modules which facilitate the interaction between the processing component 902 and other components. For instance, the processing component 902 may include a multimedia module to facilitate the interaction between the multimedia component 908 and the processing component 902.

The memory 904 is configured to store various types of data to support the operation of the device 900. Examples of such data include instructions for any applications or methods operated on the device 900, contact data, phonebook data, messages, pictures, video, etc. The memory 904 may be implemented using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 906 provides power to various components of the device 900. The power component 906 may include a power management system, one or more power sources, and any other components associated with the generation, management, and distribution of power in the device 900.

The multimedia component 908 includes a screen providing an output interface between the device 900 and the user. In some embodiments, the screen may include a liquid crystal display (LCD) and a touch panel. If the screen includes the touch panel, the screen may be implemented as a touch screen to receive input signals from the user. The touch panel includes one or more touch sensors to sense touches, swipes, and gestures on the touch panel. The touch sensors may not only sense a boundary of a touch or swipe action, but also sense a period of time and a pressure associated with the touch or swipe action. In some embodiments, the multimedia component 908 includes a front camera and/or a rear camera. The front camera and the rear camera may receive an external multimedia datum while the device 900 is in an operation mode, such as a photographing mode or a video mode. Each of the front camera and the rear camera may be a fixed optical lens system or have focus and optical zoom capability.

The audio component 910 is configured to output and/or input audio signals. For example, the audio component 910 includes a microphone configured to receive an external audio signal when the device 900 is in an operation mode, such as a call mode, a recording mode, and a voice recognition mode. The received audio signal may be further stored in the memory 904 or transmitted via the communication component 916. In some embodiments, the audio component 910 further includes a speaker to output audio signals.

The I/O interface 912 provides an interface between the processing component 902 and peripheral interface modules, such as a keyboard, a click wheel, buttons, and the like. The buttons may include, but are not limited to, a home button, a volume button, a starting button, and a locking button.

The sensor component 914 includes one or more sensors to provide status assessments of various aspects of the device 900. For instance, the sensor component 914 may detect an open/closed status of the device 900, relative positioning of components, e.g., the display and the keypad, of the device 900, a change in position of the device 900 or a component of the device 900, a presence or absence of user contact with the device 900, an orientation or an acceleration/deceleration of the device 900, and a change in temperature of the device 900. The sensor component 914 may include a proximity sensor configured to detect the presence of nearby objects without any physical contact. The sensor component 914 may also include a light sensor, such as a CMOS or CCD image sensor, for use in imaging applications. In some embodiments, the sensor component 914 may also include an accelerometer sensor, a gyroscope sensor, a magnetic sensor, a pressure sensor, or a temperature sensor.

The communication component 916 is configured to facilitate communication, wired or wirelessly, between the device 900 and other devices. The device 900 can access a wireless network based on a communication standard, such as WiFi, 2G, 3G. or 4G or a combination thereof. In one exemplary embodiment, the communication component 916 receives a broadcast signal or broadcast associated information from an external broadcast management system via a broadcast channel. In one exemplary embodiment, the communication component 916 further includes a near field communication (NFC) module to facilitate short-range communications. For example, the NFC module may be implemented based on a radio frequency identification (RFID) technology, an infrared data association (IrDA) technology, an ultra-wideband (UWB) technology, a Bluetooth (BT) technology, and other technologies.

In exemplary embodiments, the device 900 may be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing the above described methods.

In exemplary embodiments, there is also provided a non-transitory computer-readable storage medium including instructions, such as included in the memory 904, executable by the processor 920 in the device 900, for performing the above-described methods. For example, the non-transitory computer-readable storage medium may be a ROM, a RAM, a CD-ROM, a magnetic tape, a floppy disc, an optical data storage device, and the like.

One of ordinary skill in the art will understand that the above described modules can each be implemented by hardware, or software, or a combination of hardware and software. One of ordinary skill in the art will also understand that multiple ones of the above described modules may be combined as one module, and each of the above described modules may be further divided into a plurality of sub-modules.

Other embodiments of the invention will be apparent to those skilled in the art from consideration of the specification and practice of the invention disclosed here. This application is intended to cover any variations, uses, or adaptations of the invention following the general principles thereof and including such departures from the present disclosure as come within known or customary practice in the art. It is intended that the specification and examples be considered as exemplary only, with a true scope and spirit of the invention being indicated by the following claims.

It will be appreciated that the present invention is not limited to the exact construction that has been described above and illustrated in the accompanying drawings, and that various modifications and changes can be made without departing from the scope thereof. It is intended that the scope of the invention only be limited by the appended claims.

What is claimed is:

1. A method for a device to perform cell reselection, comprising:
   when the device resides in a current serving cell, determining whether a neighboring cell meets a cell reselection condition;
   obtaining cell reselection information corresponding to the neighboring cell when the neighboring cell meets the cell reselection condition;
   determining whether the cell reselection information matches any one of one or more historical ping-pong reselection records, wherein the cell reselection information includes at least a current cell reselection time, and each of the one or more historical ping-pong reselection records includes at least a historical cell reselection time corresponding to the ping-pong reselection record;
   determining whether a time difference between the current cell reselection time and the historical cell reselection time corresponding to a first historical ping-pong reselection record of the one or more historical ping-pong reselection records is greater than a preset time difference when the cell reselection information matches the first historical ping-pong reselection record; and
   reselecting the neighboring cell as a current serving cell when the time difference between the current cell reselection time and the historical cell reselection time corresponding to the first historical ping-pong reselection record is greater than the preset time difference.

2. The method according to claim 1, further comprising:
   after reselecting the neighboring cell as the current serving cell, extending the preset time difference; and
   recording the cell reselection information into the historical ping-pong reselection records to update the historical ping-pong reselection records.

3. The method according to claim 1, wherein the determining whether the neighboring cell meets the cell reselection condition comprises:
   obtaining a cell reselection parameter; and
   determining whether the neighboring cell meets the cell reselection condition according to the cell reselection parameter.

4. The method according to claim 3, wherein the obtaining the cell reselection parameter comprises performing at least one of:
   receiving system information sent from a base station of the current serving cell, wherein the system information includes at least one of a reselection priority of the current serving cell, a minimum access level of the current serving cell, a reselection priority of the neighboring cell, or a minimum access level of the neighboring cell; or measuring a signal quality of the current serving cell and a signal quality of the neighboring cell, each including at least one of a current signal level, a reference signal receiving power, or a reference signal receiving quality.

5. The method according to claim 4, wherein the determining whether the neighboring cell meets the cell reselection condition according to the cell reselection parameter comprises:
if the cell reselection parameter meets a preset condition, determining that the neighboring cell meets the cell reselection condition, wherein the preset condition includes at least one of:
the current signal level of the neighboring cell is not lower than the minimum access level of the neighboring cell and the reselection priority of the neighboring cell is higher than the reselection priority of the current serving cell;
a signal level corresponding to the reference signal receiving power of the neighboring cell is not lower than the minimum access level of the neighboring cell and the reselection priority of the neighboring cell is higher than the reselection priority of the current serving cell; or
the current signal level of the current serving cell is lower than the minimum access level of the current serving cell and the reselection priority of the neighboring cell is lower than the reselection priority of the current serving cell.

6. The method according to claim 4, wherein if there exist at least two neighboring cells which meet the cell reselection condition, the obtaining of the cell reselection information corresponding to the neighboring cell comprises:
according to a reselection priority and/or a signal quality of each of the at least two neighboring cells, determining a target neighboring cell among the at least two neighboring cells; and
obtaining the cell reselection information corresponding to the target neighboring cell.

7. The method according to claim 1, wherein the cell reselection information further comprises at least one of: an identification of the current serving cell, an identification of the neighboring cell, or a reason for the cell reselection; and
wherein each of the one or more historical ping-pong reselection records further comprises at least one of: an identification of a source cell corresponding to the ping-pong reselection record, an identification of a destination cell corresponding to the ping-pong reselection record, or a reason for cell reselection corresponding to the ping-pong reselection record.

8. The method according to claim 7, wherein the determining whether the cell reselection information matches a historical ping-pong reselection record comprises:
if the cell reselection information and one of the one or more historical ping-pong reselection records meet a matching condition, determining that the cell reselection information matches the one of the one or more historical ping-pong reselection records, wherein the matching condition includes:
the identification of the current serving cell matches the identification of the source cell corresponding to the one of the one or more historical ping-pong reselection records;
the identification of the neighboring cell matches the identification of the destination cell corresponding to the one of the one or more historical ping-pong reselection records; and the reason for the cell reselection included in the cell reselection information matches the reason for cell reselection corresponding to the one of the one or more historical ping-pong reselection records.

9. The method according to claim 1, wherein the preset time difference represents a shortest ping-pong reselection time interval during a ping-pong cell reselection procedure.

10. A device for cell reselection, comprising:
a processor; and
a memory for storing instructions executable by the processor;
wherein the processor is configured to:
when the device resides in a current serving cell, determine whether a neighboring cell meets a cell reselection condition;
obtain cell reselection information corresponding to the neighboring cell when the neighboring cell meets the cell reselection condition;
determine whether the cell reselection information matches any one of one or more historical ping-pong reselection records, wherein the cell reselection information includes at least a current cell reselection time, and each of the one or more historical ping-pong reselection records includes at least a historical cell reselection time corresponding to the ping-pong reselection record;
determine whether a time difference between the current cell reselection time and the historical cell reselection time corresponding to a first historical ping-pong reselection record of the one or more historical ping-pong reselection records is greater than a preset time difference when the cell reselection information matches the first historical ping-pong reselection record; and
reselect the neighboring cell as a current serving cell when the time difference between the current cell reselection time and the historical cell reselection time corresponding to the first historical ping-pong reselection record is greater than the preset time difference.

11. The device according to claim 10, wherein the processor is further configured to:
after reselecting the neighboring cell as the current serving cell, extend the preset time difference; and
record the cell reselection information into the historical ping-pong reselection records to update the historical ping-pong reselection records.

12. The device according to claim 10, wherein the processor is further configured to:
obtain a cell reselection parameter; and
determine whether the neighboring cell meets the cell reselection condition according to the cell reselection parameter.

13. The device according to claim 12, wherein the processor is configured to perform at least one of:
receiving system information sent from a base station of the current serving cell, wherein the system information includes at least one of a reselection priority of the current serving cell, a minimum access level of the current serving cell, a reselection priority of the neighboring cell, or a minimum access level of the neighboring cell; or
measuring a signal quality of the current serving cell and a signal quality of the neighboring cell, each including at least one of a current signal level, a reference signal receiving power, or a reference signal receiving quality.

14. The device according to claim 13, wherein the processor is further configured to:

if the cell reselection parameter meets a preset condition, determine that the neighboring cell meets the cell reselection condition, wherein the preset condition includes at least one of:
the current signal level of the neighboring cell is not lower than the minimum access level of the neighboring cell and the reselection priority of the neighboring cell is higher than the reselection priority of the current serving cell;
a signal level corresponding to the reference signal receiving power of the neighboring cell is not lower than the minimum access level of the neighboring cell and the reselection priority of the neighboring cell is higher than the reselection priority of the current serving cell; or
the current signal level of the current serving cell is lower than the minimum access level of the current serving cell and the reselection priority of the neighboring cell is lower than the reselection priority of the current serving cell.

15. The device according to claim 13, wherein if there exist at least two neighboring cells which meet the cell reselection condition, the processor is further configured to:
according to a reselection priority and/or a signal quality of each of the at least two neighboring cells, determine a target neighboring cell among the at least two neighboring cells; and
obtain the cell reselection information corresponding to the target neighboring cell.

16. The device according to claim 10, wherein the cell reselection information further comprises at least one of: an identification of the current serving cell, an identification of the neighboring cell, or a reason for the cell reselection; and
wherein each of the one or more historical ping-pong reselection records further comprises at least one of: an identification of a source cell corresponding to the ping-pong reselection record, an identification of a destination cell corresponding to the ping-pong reselection record, or a reason for cell reselection corresponding to the ping-pong reselection record.

17. The device according to claim 16, wherein the processor is further configured to:
if the cell reselection information and one of the one or more historical ping-pong reselection records meet a matching condition, determine that the cell reselection information matches the one of the one or more historical ping-pong reselection records, wherein the matching condition includes:
the identification of the current serving cell matches the identification of the source cell corresponding to the one of the one or more historical ping-pong reselection records;
the identification of the neighboring cell matches the identification of the destination cell corresponding to the one of the one or more historical ping-pong reselection records; and
the reason for the cell reselection included in the cell reselection information matches the reason for cell reselection corresponding to the one of the one or more historical ping-pong reselection records.

18. A non-transitory computer-readable storage medium having stored therein instructions that, when executed by a processor of a device, cause the device to perform a method for cell reselection, the method comprising:
when the device resides in a current serving cell, determining whether a neighboring cell meets a cell reselection condition;
obtaining cell reselection information corresponding to the neighboring cell when the neighboring cell meets the cell reselection condition;
determining whether the cell reselection information matches any one of one or more historical ping-pong reselection records, wherein the cell reselection information includes at least a current cell reselection time, and each of the one or more historical ping-pong reselection records includes at least a historical cell reselection time corresponding to the ping-pong reselection record;
determining whether a time difference between the current cell reselection time and the historical cell reselection time corresponding to a first historical ping-pong reselection record of the one or more historical ping-pong reselection records is greater than a preset time difference when the cell reselection information matches the first historical ping-pong reselection record; and
reselecting the neighboring cell as a current serving cell when the time difference between the current cell reselection time and the historical cell reselection time corresponding to the first historical ping-pong reselection record is greater than the preset time difference.

* * * * *